(12) United States Patent
Weselak

(10) Patent No.: US 9,469,045 B2
(45) Date of Patent: Oct. 18, 2016

(54) WOOD TREATMENT DIPPING STATION

(71) Applicant: Karl Weselak, Eugene, OR (US)

(72) Inventor: Karl Weselak, Eugene, OR (US)

( * ) Notice: Subject to any disclaimer, the term of this patent is extended or adjusted under 35 U.S.C. 154(b) by 0 days.

(21) Appl. No.: 14/182,578

(22) Filed: Feb. 18, 2014

(65) Prior Publication Data

US 2015/0231666 A1   Aug. 20, 2015

(51) Int. Cl.
| | | |
|---|---|---|
| *B27K 5/02* | (2006.01) | |
| *B05D 1/18* | (2006.01) | |
| *B27K 3/02* | (2006.01) | |
| *B27K 3/04* | (2006.01) | |
| *F26B 3/28* | (2006.01) | |

(52) U.S. Cl.
CPC . *B27K 5/02* (2013.01); *B05D 1/18* (2013.01); *B27K 3/0292* (2013.01); *B27K 3/04* (2013.01); *B05D 2203/20* (2013.01); *C08J 2205/10* (2013.01); *F26B 3/28* (2013.01); *F26B 2210/16* (2013.01)

(58) Field of Classification Search
CPC  B05D 1/18; B05D 2206/20; B05D 2203/20; G03C 2001/7444
USPC ................... 220/572, 570; 427/400
See application file for complete search history.

(56) References Cited

U.S. PATENT DOCUMENTS

| | | | | |
|---|---|---|---|---|
| 1,017,455 | A  * | 2/1912 | Otto ............................. | 220/572 |
| 3,602,939 | A  * | 9/1971 | Schoenholz ............... | 15/257.06 |
| 6,047,845 | A  * | 4/2000 | Rapaz ......................... | 220/575 |
| 6,332,556 | B1 * | 12/2001 | Shalman ..................... | 220/570 |
| 7,363,936 | B1 * | 4/2008 | Simoneaux et al. ......... | 137/312 |
| 8,167,164 | B2 * | 5/2012 | Peterson ..................... | 220/570 |
| 8,281,952 | B2 * | 10/2012 | Robellard et al. ........... | 220/570 |
| 2004/0195248 | A1 * | 10/2004 | Garcia ......................... | 220/570 |
| 2014/0263363 | A1 * | 9/2014 | Sherman ...................... | 220/570 |

* cited by examiner

*Primary Examiner* — Jeffrey Allen
*Assistant Examiner* — Jennifer Castriotta

(57) ABSTRACT

A wood treatment station based on the concept of submerging wood with the ability to stage the wood and recover excess wood treatment prior to drying.

1 Claim, 2 Drawing Sheets

6' 4"
10"
1' 8"

WOOD TREATMENT DIPPING STATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of treating or covering wood. More specifically, the present invention is in the technical field of applying a wood treatment to wood by submerging the wood and staging it prior to drying.

SUMMARY OF THE INVENTION

The present invention is an elongated container which provides an area for submerging wood into a liquid wood treatment, and an area for staging the wood post-treatment to recover excess wood treatment for reuse.

DETAILED DESCRIPTION OF THE INVENTION

Figure 1:
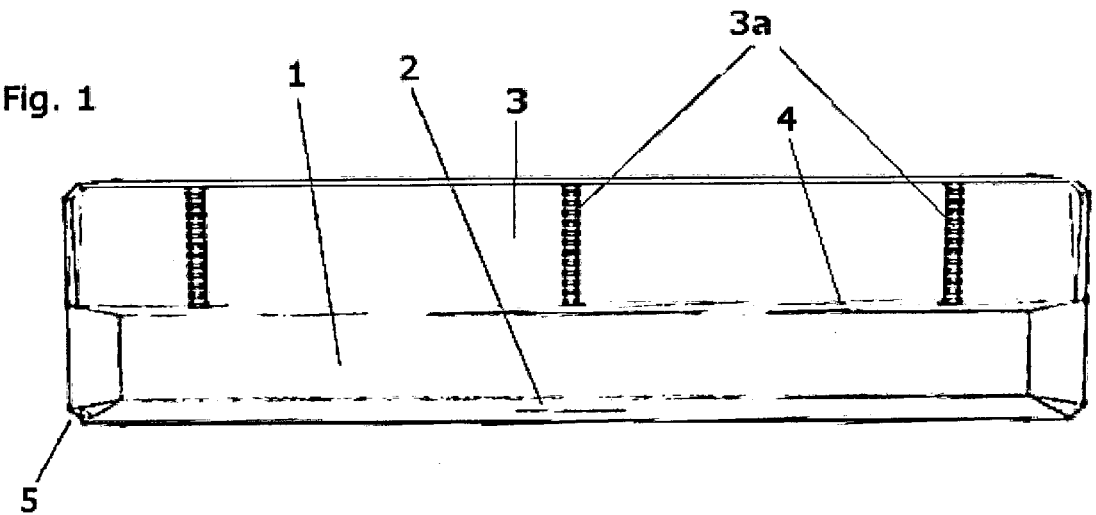
FIG. 1 is the overhead perspective of the wood treatment apparatus.

Referring to the invention in more detail, in FIG. 1 an elongated dipping trough (1) accepts a recommended amount of liquid wood treatment (ex: wood preservative, stain, paint, etc) according to minimum and/or maximum filling range indicator(s) (2) on the side of the dipping trough. A sloped recovery shelf (3) serves as a staging area where wood is temporarily stored on a plural set of parallel racks (3a) to allow excess treatment to drain (4) back into the dipping trough. The dipping trough includes a pouring spout or spouts (5) at one or both of the outside corners of the trough.

Figure 2:
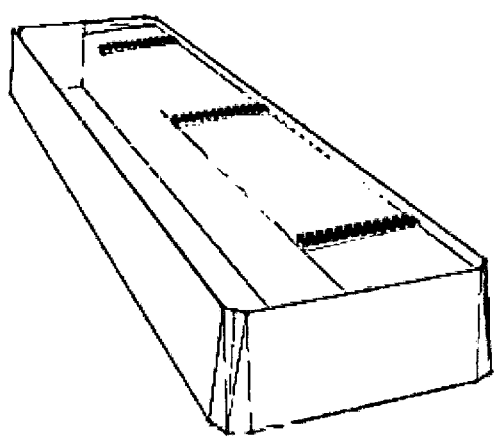
FIG. 2 is the front-right side perspective.
Figure 3:
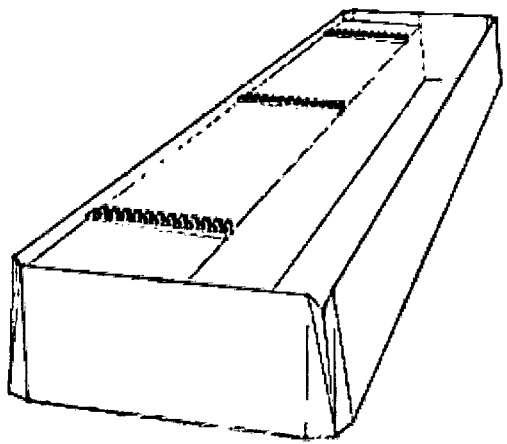
FIG. 3 is the front-left side perspective.
Figure 4:
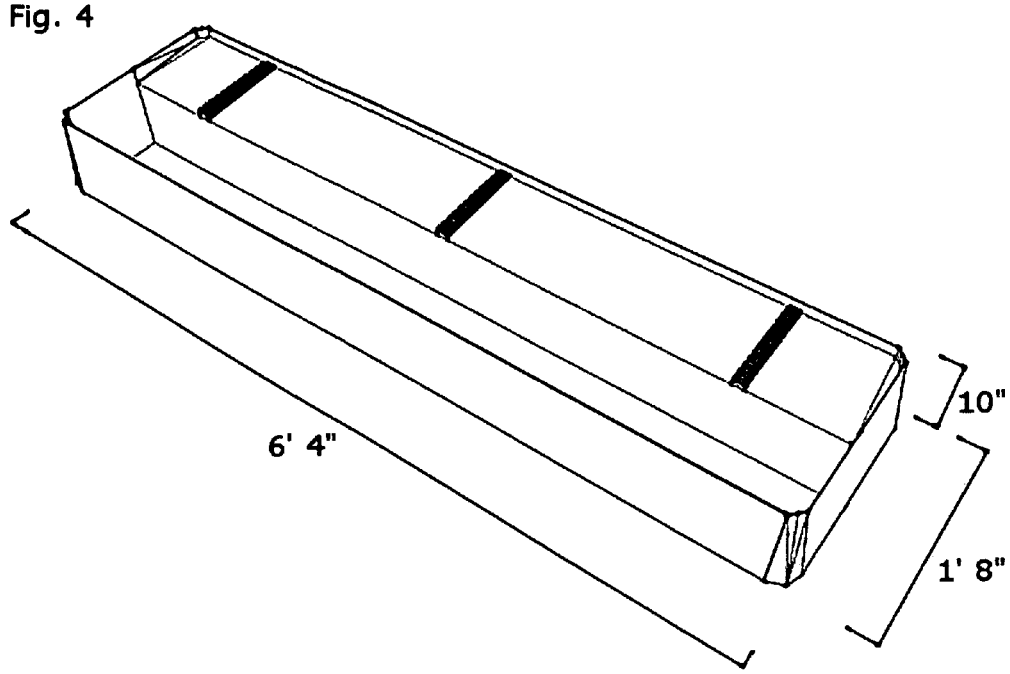
FIG. 4 is a perspective with estimated dimensions.

Referring to FIG. 2 and FIG. 3, are front-right side and front-left side perspective views In further detail, referring to FIG. 4, the apparatus has estimated dimensions of 6'4"L×1'8"W×10"H. Dimensions may vary to accept larger or smaller sizes of wood.

Figure 5:
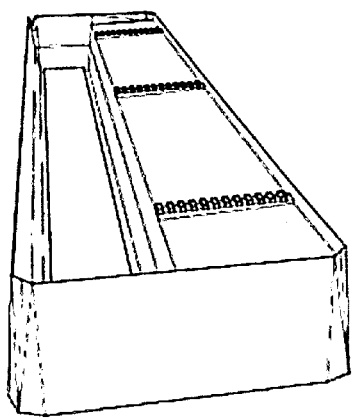
FIG. 5 is a perspective view of a piece of wood submerged in the dipping trough.

Referring to FIG. 5, a wood board is shown submerged in liquid in the dipping trough.

Figure 6:
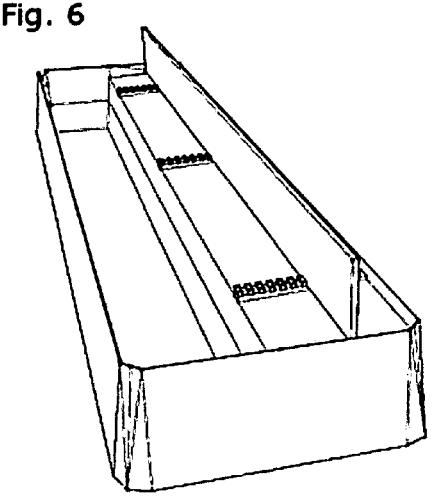
FIG. 6 is a perspective view of a piece of wood staged on the recovery shelf.

Referring now to FIG. 6, a wood board is shown racked in the sloped recovery shelf.

The construction details of the invention as shown in FIG. 1 through FIG. 6 are that the apparatus be a molded unit made of plastic or composite material durable enough to withstand wear, tear, and punctures from the wood, sturdy enough to support the weight of multiple pieces of wood, and impervious to liquid and chemicals found in common wood treatments.

The primary advantages of the this invention include, but are not limited to, that it saves time treating wood. In particular rough-cut wood like fence boards. Dipping a piece of wood can treat the entire piece of wood (all sides) within a few seconds, whereas brushes and rollers can take much longer. By saturating all sides of the wood, you ensure full coverage and are likely to prolong the lifetime of the wood. This invention also reduces, if not eliminates, waste—excess treatment is collected on the recovery shelf, drains back into the trough, and can be poured back into its original container for re-use.

While the foregoing written description of the invention is based on estimated dimensions to support a common 1"×6"×6' fence board, the utility provided by this apparatus can be applied to smaller dimensional wood. Likewise, the apparatus may be designed with different dimensions to accommodate larger pieces of wood. The invention should therefore not be limited by the above described embodiment, method, and examples, but by all embodiments and methods within the scope and spirit of the invention as claimed.

The invention claimed is:

1. An apparatus for submerging wood for the purpose of applying wood treatment comprising:
    a plastic molded trough for submerging the wood;
    a plastic molded sloped recovery shelf directly connected to, and sloped towards the trough, the shelf having a plurality of parallel racks along the top surface of the shelf for staging the wood to dry and collect excess liquid, allowing the liquid to drain back into the trough; and
    the apparatus being sized such that it may support a six foot fence board.

* * * * *